May 24, 1938.   R. H. WALLACE ET AL   2,118,448
METHOD OF MAKING AUTOMOBILE FRAMES
Filed June 30, 1934   4 Sheets-Sheet 1
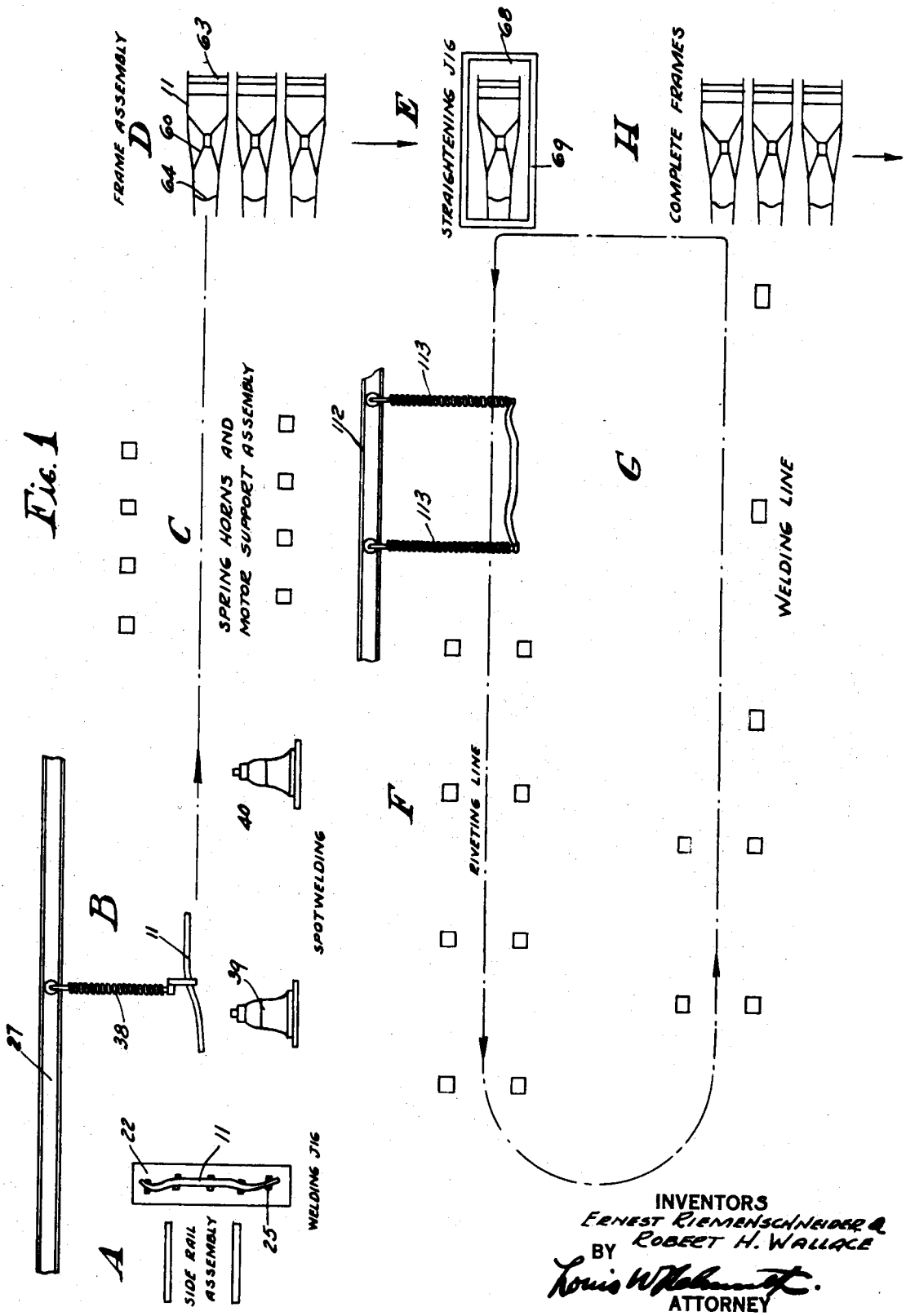

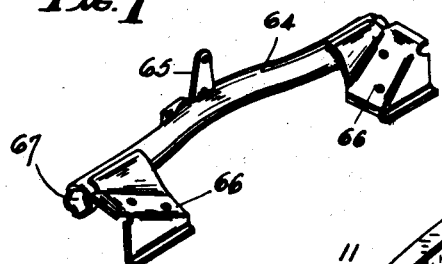
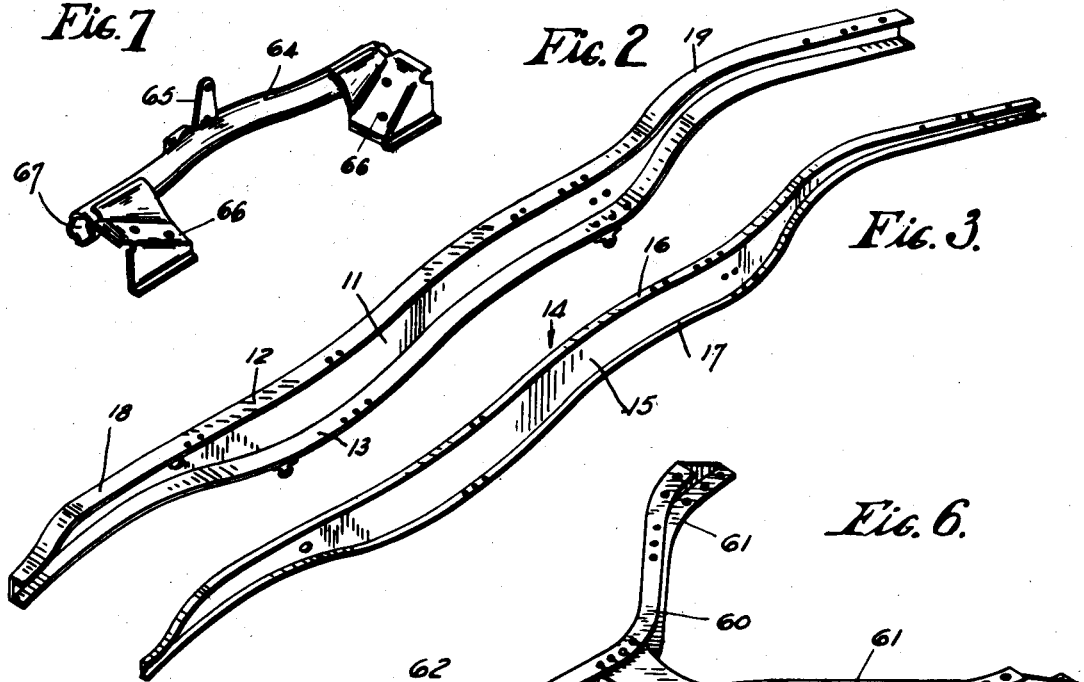
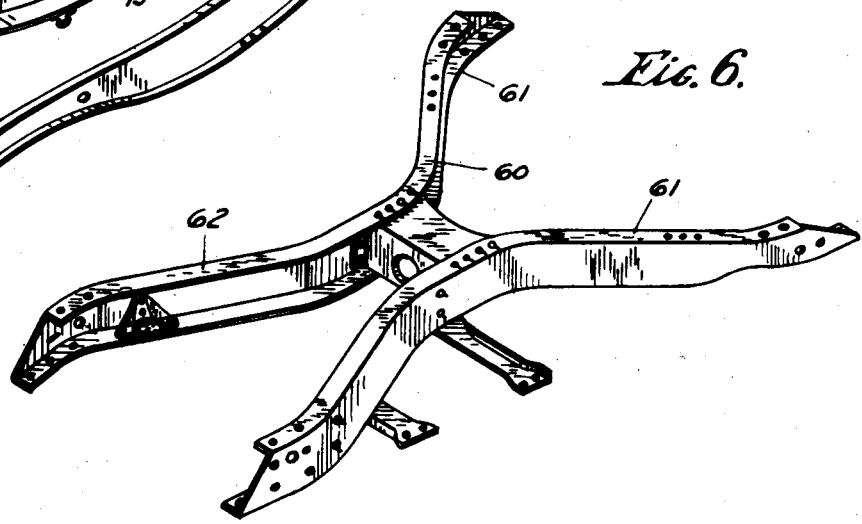
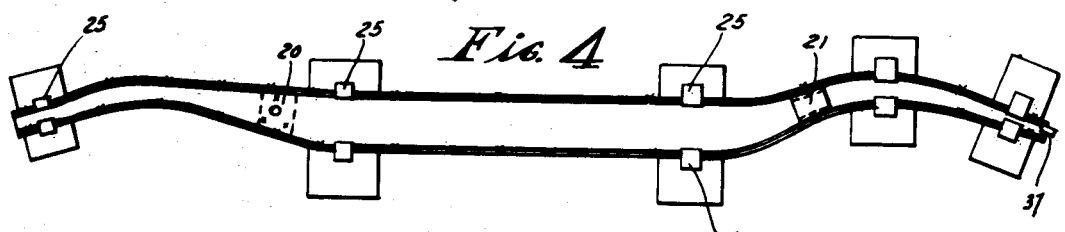
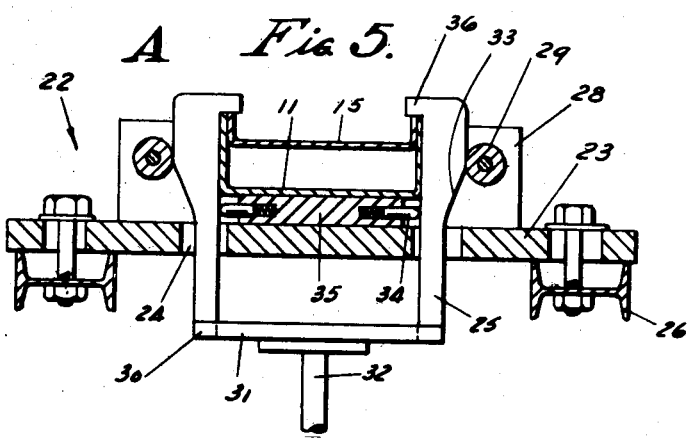

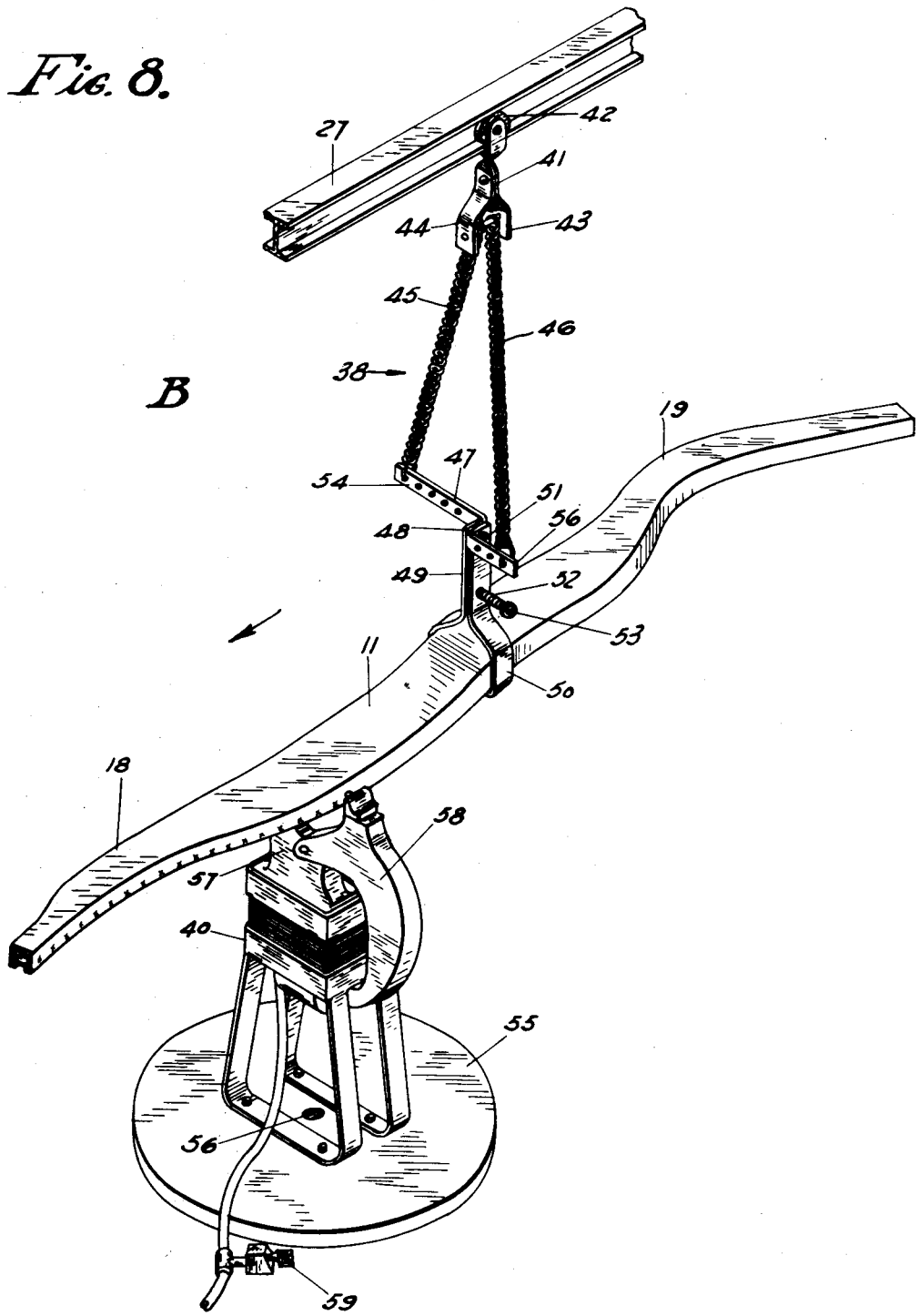

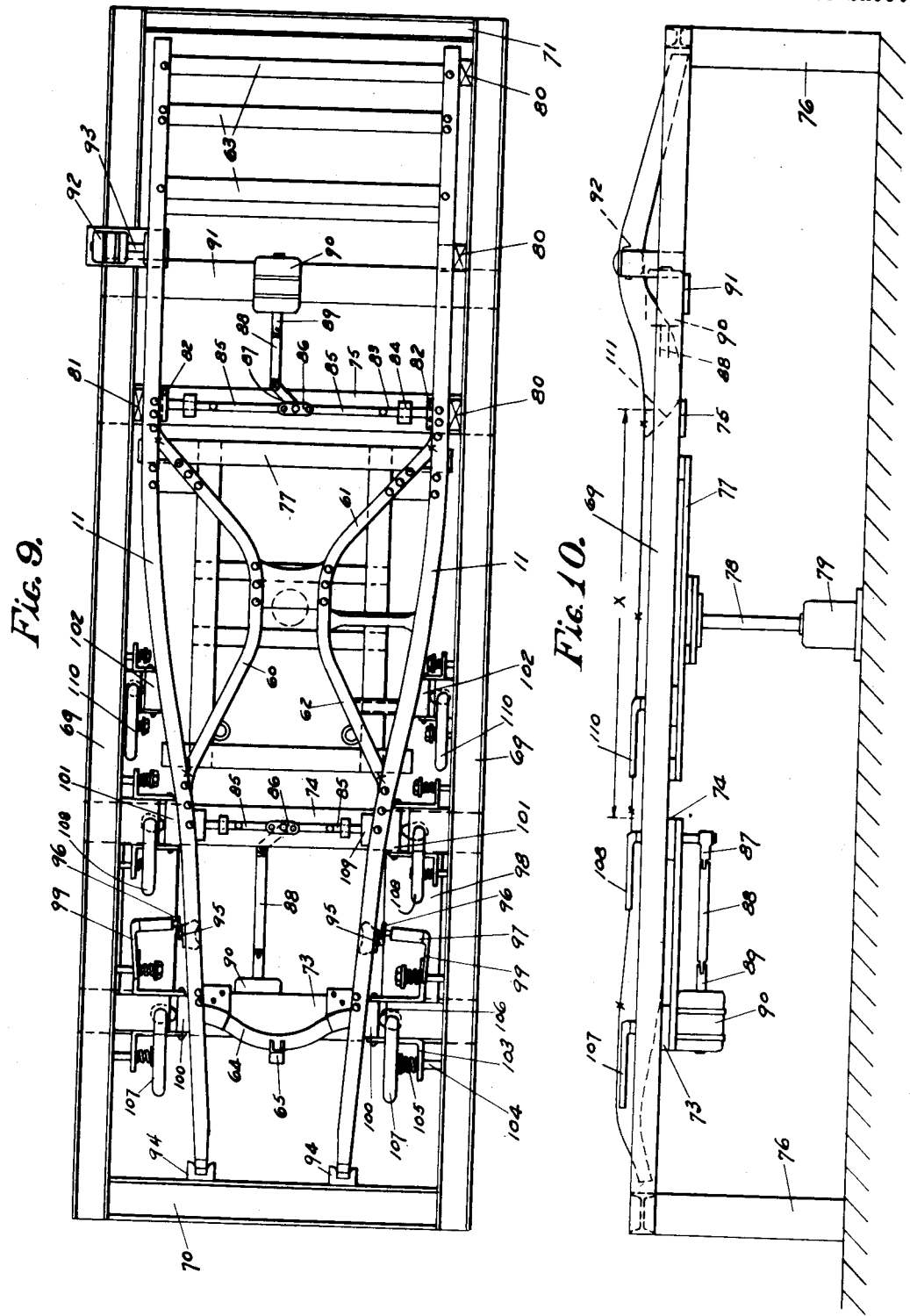

Patented May 24, 1938

2,118,448

UNITED STATES PATENT OFFICE 2,118,448

METHOD OF MAKING AUTOMOBILE FRAMES

Robert H. Wallace and Ernest Riemenschneider, Lakewood, Ohio, assignors to The Midland Steel Products Company, Cleveland, Ohio, a corporation of Ohio Application June 30, 1934, Serial No. 733,290

14 Claims. (Cl. 29—152)

This invention relates to new and useful improvements in automobile frames and method of making the same and more particularly to what are now known as welded frames in which substantially all of the cross connecting members are welded to side rails possessing greater rigidity than the customary channel section rails, whereby a frame of greater rigidity than the former all-riveted frame is provided.

With former frames possessing more or less flexible channel side rails, whenever there occurred slight misalignment of corresponding portions of the two rails, this could be usually corrected by directing impacts on the misaligned portions to position the same for the attachment of other component preformed parts of the vehicle and mounting of the radiator and engine. However, when the side rails are made absolutely rigid, as by forming them into completely closed box cross section, a frame is provided which is not susceptible of being pounded into shape, with the result that when these new rigid frames are completed, their corresponding parts and all attachment holes must be in absolutely correct position so that the other component parts of the vehicle will accurately fit together and be secured to the foundation frame without any straining of the parts. The accuracy with which such frames must be manufactured can be appreciated to a greater extent when consideration is given to the fact that they are usually handled several times and shipped by freight to the automobile assembly plant prior to the component parts of the vehicle being assembled with the frame.

An important object of the invention is to provide an improved construction for the side rails and a method for manufacturing the frame.

A further object of the invention is to provide a method in which the side rails and cross members are assembled and preliminarily connected, whereby the entire frame may be placed in a final assembly jig in order that the component parts of the frame can be moved in their final predetermined accurate relationship and permanently and rigidly connected.

Another object of the invention is to provide means in the assembly line whereby the component parts of each individual rail can be permanently secured together as the rail is being moved in a rectilinear path through the assembly line and without the necessity of the operator twisting and turning the rails for the appropriate welding operations along contoured edges.

Still another object of the invention is to provide side rail and frame assembly jigs facilitating the operation and insuring the setting of the side rails and entire frames in final accurate form.

Other objects and advantages of the invention will become apparent during the course of the following description.

In the accompanying drawings forming a part of the description and wherein like numerals are employed to designate like parts throughout the several views, Fig. 1 is a diagrammatic floor plan of the assembly line for carrying out the method, Fig. 2 is a perspective view of the main side rail, Fig. 3 is a perspective view of an inner reinforcing rail, Fig. 4 is a plan illustrating a rail assembly jig, Fig. 5 is an enlarged transverse section of a portion thereof, Fig. 6 is a perspective view of the X member of the frame, Fig. 7 is a perspective view of a front cross member of the frame, Fig. 8 is a perspective view illustrating the manner in which the side rails are supported for longitudinal movement through the line and the welding equipment for assembling the component parts of the rail, Fig. 9 is a top plan of a final assembly jig for truing up the frame and assuring accurate location of the component parts thereof, Fig. 10 is a side elevation of the same.

Referring to the plan of the assembly line shown in Fig. 1, the various stations or units thereof are designated with reference letters; the letter A designating the assembly station for the individual side rails, B designating the side rail welding section, the letter C designates a unit of riveting presses for attaching such adjuncts as spring hangers to the individual rails; the letter D designates the station where the cross members are preliminarily connected in approximate location with a pair of side rails to constitute a frame and the station E represents the final assembly jig in which the cross members are permanently attached to the side rails after the parts are properly located by the jig. The section F represents a plurality of riveting fixtures in which certain parts are riveted, the letter G represents a line of welders for performing further welding operations and the station H represents the final delivery station or rack from which the frames are transported to an automatic painting machine.

Referring now more in detail to the drawings for the purposes of illustrating one example of the invention, the numeral 11 designates a channel shaped main side rail having upper and lower parallel flanges 12 and 13 respectively. This rail is constructed of much lighter gauge stock than is customarily used due to the fact that it is subsequently formed into closed box-section by a reinforcement extending the entire length thereof and being of similar shape and cross section as best shown in Fig. 5 and which for convenience of reference, will be designated as the inner rail 14 composed of a web portion 15 and upper and lower parallel flanges 16 and 17 respectively. Both of these rails are blanked to shape with all requisite openings in the web and flanges thereof for the attachment of cross braces, spring hangers, reinforcements, body bolts, cross shaft etc. after which they are formed into the channel cross section shown in the drawings with a front kickup portion 18 adapted to be disposed in proximity to the front wheels and a rear kickup portion 19 disposed adjacent the rear wheels. The flanges of the inner rail 14 are not as wide as those of the outer or main rail as shown in Fig. 5 so that when the inner rail is nested within the channel of the outer rail, a closed box cross section results wherein the webs of the two rails are spaced apart and the free edges of the corresponding flanges are flush with one another and in abutment for the subsequent spot welding thereof. Two of such side rails are provided for each frame and the individual rails are assembled at the side rail assembly station A where reinforcements of solid, channel and box formation are properly positioned within the outer rail 11 with suitable centering pins after which the inner rail 14 is nested within the main rail with corresponding apertures in the two rails in registration for the insertion of centering pins through the flanges thereof whereby the assembled side rail can be placed in a welding jig 22 as shown in Fig. 1 at assembly station A. This welding jig is employed for truing up the individual side rails and welding them in proper shape, as they are constructed of extremely light gauge stock and are very flexible prior to the attachment of the inner rails 14.

This welding jig is composed of a platform 23 suitably apertured at spaced intervals as indicated at 24 for the extension of pairs of clamping jaws 25 and is mounted on a suitable supporting structure 26 close to an overhead track 27 for conveyance of the rails through a welding station B. The platform 23 is provided with a series of clamping jaws 25 to clamp each individual rail in the welding jig and flex it to final shape; there being in the present instance five pairs of clamping jaws; one at each end of the frame, one at the inner portion of each front and rear kickup and one at approximately the mid-point of the rear kickup. At each of these points, the platform 23 is provided with a pair of openings 24 for the passage of each pair of clamping jaws and outwardly of each opening is provided with supports 28 for journaling of rollers 29 adapted to engage the outer edges of the jaws 25. Each pair of jaws 25 is pivotally connected as at 30 to a platform 31 carried by the upper end of a piston rod 32 extending into an air cylinder not shown. A suitable control valve for the air cylinder is located in a convenient place for the operator of the jig to trip, for admitting air into the cylinder at one end for raising the clamping jaws 25 to release the work and at the other end for moving them downwardly to grip the work. The outer edges of the clamping jaws 25 are provided with cammed surfaces 33 adapted to ride upon the rollers 29, moving the jaws inwardly to clamping engagement with the rail as they move downwardly with the piston rod 32 and are forced against spring pressed plungers 34 mounted in a bed plate 35 so that as the jaws are raised and pass beyond the cams 33, they are simultaneously moved outwardly by the spring pressed plungers 34 to completely disengage the rail. The entire series of clamping jaws operates simultaneously and when moved to gripping position, carry their angularly disposed ends over the edges of the flanges while the inner edges of the jaws firmly clamp the outer surfaces of the flanges 12 and 13 as shown clearly in Fig. 5. With each side rail clamped in the welding jig 22, the edges of the flanges of the inner and outer rails 11 and 14 are tack welded together at a plurality of points along their lengths as indicated by the X's in Fig. 4; these points of welding being preferably located to simultaneously attach the reinforcements inside of the rail to the flanges thereof, although if desired the reinforcements may be held in place by the inner and outer rails for subsequent permanent attachment. About twenty-one of these tack welds are made along each side rail while it is held in proper shape by the jig 22. This forms the side rail into completely closed box section to possess the requisite rigidity and shape and from this point on through the line it can be handled without distortion occurring. A suitable stop 37 is provided on the bed of the jig so that the assembled side rail can be moved with its rear end abutting said stop to properly locate the rail with respect to the series of clamps 25.

After the side rails are tack welded and are released from the jig 22, they are picked up by trolley conveyors 38 traversing circuitous tracks 27 and conveyed through the welding station B. These trolley conveyors are of novel construction as only one is used to support and convey each side rail. Each rail must be supported horizontally and lengthwise of the line with the flanges of the rails extending toward the floor for convenient and speedy operations thereon by the spot welders 39 and 40 as the rails are being continuously conveyed in the direction of the arrow in Figs. 1 and 8. Due to the contour of the rail and the front and rear kickups 18 and 19 of each rail extending to one side thereof when it is supported in this position, causing a tendency for it to tilt toward that side, a special trolley conveyor 38 is provided for supporting each rail at one point near its mid-section with the web 11 thereof in a horizontal plane and the flanges depending therefrom as described. Each of these trolley conveyors for engaging the outwardly bowed mid-section of the rail comprises a trolley bracket 41 having arms straddling the lower flange of an I-section overhead track 27 for journaling rollers 42 to ride along this lower flange by moving the hanger lengthwise of the rail. The lower end of this bracket is provided with a pair of spaced arms 43 supporting a bolt 44 therebetween and constituting a support for the suspension of a pair of tension springs 45 and 46. The lower ends of these springs are connected to a balancing bar 47 having an intermediate angularly disposed portion 48 mounted between the upper ends of a pair of clamping jaws 50 by means of a bolt 51 which is of a size to permit lateral separation of the jaws under the resistance of a spring 52 mounted on a bolt 53 between an abutment at its outer end and one of the jaws 50 to normally retain them in normal closed position as shown in Fig. 8. The balancing bar 47 is provided with an arm 54 longer than the arm 56 on the other side of the intermediate portion 48 so that the trolley conveyor will support the rail with its web 11 in a perfectly horizontal plane. Each arm is provided with a series of spaced openings whereby the lower ends of the springs 45 and 46 can be connected with the arms at varying distances from the upper ends of the jaws to properly support rails of varying contours and degrees of kick up portions in a horizontal plane. To release the rail from the clamping jaws, the rail is simply turned or tilted about its longitudinal axis thereby causing one edge to engage the inclined portion of one of the jaws 50 to cam it outwardly to separate the jaws and to permit the side rail to be automatically released from the grip of the jaws.

It being proposed to spot weld the overlapping portions of the flanges of the inner and outer rails together at closely spaced intervals throughout the length of the rail, and the contour of the rail being such as to ordinarily necessitate moving it from one side to the other out of its line of travel to effectively weld the overlapping flanges, each spot welding mechanism is rigidly mounted on a small circular base 55 which is swivelly mounted at its center 56 on the floor beneath the track 27 so that each spot welding mechanism can adapt itself to the contour of the rail for establishing good electrical contact therewith while the latter is moved along a rectilinear path by the operator. Each spot welder is equipped with a stationary contact jaw 57 and a pivotally mounted contact jaw 58 which latter is pressed into firm engagement with the flanges of the rail each time the operator depresses a foot treadle 59 mounted to one side of the base 55. A pair of these spot welders is provided for each line so that one operates upon the flanges of the inner and outer rails to be joined at one side of the rail, or its top, and the other spot welder operates on the other flanges at the bottom of the rail. An operator is provided for each spot welding mechanism and to weld the flanges together he simply pulls the rail along on the trolley hanger, to enter the depending flanges at one side of the rail, between the jaws of the spot welder where it is stopped by the operator while he depresses the foot treadle 59 causing the contact jaws 57 and 58 of the spot welder to engage the overlapping flanges and spot weld them together. The operator then releases the foot pedal and pulls the rail slightly further in the direction of the arrow shown in Fig. 8 where a second spot weld is made between the flanges, and these operations are continued so as to spot weld the flanges throughout the length of the rail at intervals of about two inches apart. These spot welders 39 and 40 are spaced longitudinally along each line so that after the flanges on one side of the rail have been welded together, it is passed through the second spot welder 40 to spot weld the flanges at the other side of the rail. Preferably, there are two tracks 27 for conveyance of the rails to the station C and a pair of spot welders are provided for each line so that two complete side rails will be moved simultaneously through the welding section B.

After the inner reinforcement rails have been spot welded in the main rails by passing through station B, the rails are released from the trolley conveyors as hereinbefore explained and passed through a series of cold riveting presses for the attachment of spring hangers 95, spring horns etc., to the individual side rails. From this station C, these individual reinforced box section side rails are passed to a preliminary frame assembly station D, where a pair of these rails are connected together by an X-shaped cross member 60 shown in detail in Fig. 6. The ends of the rear arms 61 of this X member, are, at this point, riveted to a pair of side rails by nesting the channel shaped ends in the channel shaped reinforcing inner rail 15. The ends of the forwardly extending arms 62 are positioned with their apertures in registration with apertures in the side rail so that rivets may be inserted but not headed. The rear cross members 63, of which there are three shown in the present instance, are then positioned between the side rails 11 and riveted in position, although if desired, the rivets may simply be positioned in their appropriate registering apertures to be subsequently headed or set as will be hereinafter described.

The front cross member 64 shown in detail in Fig. 7 comprises a tube suitably contoured for the attachment of a radiator support 65 to its mid-portion and motor supporting brackets 66 at its ends. These brackets are preferably prewelded to the cross member and the latter has its ends extended beyond the motor brackets 66 and provided with projections 67 for extension through the webs of the inner and outer rails. The projections 67 extend through similarly shaped openings in the webs of the outer rails 11 to be melted down and arc welded thereto. The tubular cross member is also welded to the webs of the inner rails by circumferential welds. This assembling and welding operation is performed while the frame is moving through the frame assembly station D in the direction of the final assembly jig. The frame, as it leaves station D, is, in what may be termed partially flexible condition, because all of the cross members connecting the rails are not all permanently connected thereto and the X member and cross members are relatively more flexible than the side rails, due to the fact that they are not of box cross section. The frame is left this way so that its component parts may be squared and relatively moved to their final positions by the jig 68 shown in Figs. 9 and 10.

This final assembly jig 68 is placed at station E and comprises a bed composed of a pair of longitudinal side bars 69 rigidly connected by end cross braces 70 and 71 and three or more cross braces 73, 74 and 75. This bed is supported above the floor at its four corners by means of end pedestals 76. At approximately the center of the bed frame and operating between the side bars and cross members 74 and 75 is a vertically movable platform 77 supported by a piston rod 78 of an air cylinder 79. The normal position of this platform 77 is above the plane of the bed of the jig so as to receive and support the partially assembled automobile frame from station D, after which a suitable control valve (not shown) is tripped by the operator to cause the platform 77 to descend and thereby lower the automobile frame to rest on the cross members of the jig. On one side bar 69 of the assembly jig at a point where one rear arm 61 of the X member is connected with one side rail 11, and at spaced intervals toward the rear end of the frame, three spaced fixed abutment blocks 80 for engagement with the side rails 11, as shown in Fig. 9 are provided. A single abutment block 81 is secured to the other side bar 69 to engage the other side rail of the automobile frame at a point where the other rearwardly extending member 61 of the X member is secured to the side rail. This pair of complementary abutment blocks 80 and 81 determine the final width of the frame at this particular point. Cooperating with this pair of abutments are a pair of movable pressure feet 82 carried by rods 83 preferably mounted in bearings 84 on the cross member 75 of the jig. Toggle links 85 are pivotally connected to these rods at one end and at their inner ends are pivotally connected to opposite ends of a head 86 pivotally mounted intermediate its ends in the cross member 75. This head is provided with a crank arm 87 which is pivotally connected by link 88 to a piston rod 89 operating in an air cylinder 90 mounted upon a cross member 91 of the jig. A suitable reversing and control valve, not shown, mounted adjacent one side of the jig is provided for operating the air cylinder so that when the same is operated to clamp the frame in the jig by means of the pressure feet 82, the toggle head 86 is swung on its axis to move the pivotal connections with the toggle links 85 outwardly in opposite directions thereby causing the pressure feet 82 to engage the inner sides of the two side rails 11 and move the same outwardly into firm contact with abutment blocks 80 and 81.

Prior to this operation however, an air cylinder 92 controlled from a separate valve is initially operated after the vehicle frame has been lowered into the jig so as to cause its piston 93 to move against the outside of one of the rails and thereby move the frame laterally in the jig against the three abutment blocks 80.

Referring now to the forward end of the jig, it will be noted that the front cross brace 70 is provided with a pair of spaced sockets 94 for the reception of the extreme forward ends of the side rails 11. Rear front spring hangers 95 having been secured to the side rails during their assembly when passing through station C are employed as abutments for separately and manually actuated cams 96 journaled in bearings 97 on plates 98 whereby the cams 96 engage the hangers 95 and move the entire vehicle frame forwardly so that its forward ends are pressed firmly into the sockets 94 to square the frame.

After this operation, three pairs of movable abutments 100, 101, and 102, are successively moved into engagement with the forward ends of the side rails. The pair of abutment blocks 100 engage the side rails opposite the ends of the front tubular cross member 64 and are operated substantially simultaneously by an operator on each side of the jig. Each abutment block 100 is slidably mounted transversely of the jig by a pair of brackets 103 slidably associated with the cross member 73. The outer ends of these brackets are angularly disposed to be slidably mounted on rods 104 secured to the jig and are normally pressed by means of springs 105 in a direction to cause the blocks 100 to disengage the vehicle side rails. A cam 106 is suitably mounted in the jig for engagement with each abutment block 100 and is operated by a crank handle 107 to force the abutment block into engagement with the side rail while the springs 105 serve in returning these blocks to normal position when the handle 107 is operated to release the abutment blocks 100.

The pair of abutment blocks 101 and their operating mechanisms are operated by the same kinds of cams which are controlled by the operating handles 108. These blocks 101 are slidably mounted upon the cross member 74 and are adapted to engage the vehicle side rail in proximity to where the forward member 62 of the X member joins with the side rails 11. At the same point on the vehicle frame, but engaging with the inner rails 15, are a pair of pressure feet 109, which have the same kind of operating mechanism as pressure feet 82 so that corresponding parts of the two mechanisms are designated with corresponding reference numerals. It will also be understood that both of the air cylinders 90 for operating the pressure feet 82 and 109 are both connected to the same control valve whereby they are simultaneously operated.

The third pair of movable abutments 102 are adapted to engage opposite sides of the frame just rearwardly of the points where the forward arms 62 of the X member join with the side rails. These abutments are each operated by a crank handle 110 similar to the handles 107 and 108. After a frame has been lowered to rest on the bed of the jig, the air cylinder is first operated causing the foot 93 to engage one side of the frame and move the same laterally so that its other rail engages with the three abutment blocks 80. The operators on each side of the jig then simultaneously move the handles 99 causing the cams 96 to engage the rear front spring hangers 95 and cause the frame to slide forwardly in the jig so that the forward ends of the rails enter the sockets 94 thereby squaring up the forward end of the frame. Next, the operators on each side of the jig simultaneously operate the handle 107, 108 and 110 successively in the order named so as to bring both pairs of pressure feet 100, 101, and 102 into engagement with the outside surfaces of the two side rails of the frame. One of the operators then trips the control valve for simultaneously admitting air into both air cylinders 90 whereupon through the toggle mechanisms, the pressure feet 82 and 109 are simultaneously brought into contact with the inner surfaces of the two side rails 11 thereby firmly clamping the same in their final accurate shapes.

Due to the fact that the cross members have been so connected with the side rails as to permit relative shifting movement between the cross members and side rails, the former are thereby shifted to their final accurate positions. With the frame held in its final accurate form by this jig, the operators on both sides of the jig proceed to arc weld the inner and outer rails together at any desired intervals throughout the length of the rail and the cross members to the flanges and webs of the inner reinforcing rails. The important points of welding are at the points marked with the letters X in Figs. 9 and 10 and especially the edges of the side rail are arc welded to the flanges of the forward and rear arms 61 and 62 of the X member. In addition, the tapering edges of the webs of the rear arms 61 of the X member shown by the numeral 11 in Fig. 10 are arc welded to the webs of the inner reinforcing rails. This welding of the component parts of the frame while held in accurate final shape assures maintenance of the frame in proper shape with all of its multitude of apertures in absolute precision location for the easy and rapid attachment of other component parts of the vehicle without any stretching or straining of parts to make them fit together.

By operating all of the cam handles, the various cams and blocks are returned automatically to their original positions by springs as hereinbefore described after which the control valves of the air cylinders 90 and 92 are operated to release the pressure feet and the air lift 79 so that the frame is elevated by platform 77.

The tracks 112 of a second portion of the line are arranged in circuitous form through and adjacent to stations E, F, G, and H. A pair of trolley hangers 113 are provided for each frame, one at each end, to pick up the assembled frame from the jig 68 and convey it in suspension through a series of cold riveting presses at station F for riveting together those parts in which rivets were preliminarily set at station D as well as other rivets which are positioned and set during the passage of the frame through station F. At the end of this station, the overhead tracks 112 are curved so as to cause the trolley hangers carrying frames to move in the direction of the arrow shown in Fig. 1 through station G possessing additional riveting machines and welding machines where the final riveting and welding operations are carried out to put the final touches on the frames before they are lifted from the hangers 113 and placed on a final inspection stand H from whence they are conveyed by trolley conveyors through a painting machine, drying oven and thence out into the yard to be loaded in freight trains for shipment to their destination. The trolley hangers 113 after reaching the station H are moved around the bend of the circuitous track 112 to a point adjacent to station E ready for the conveyance of additional frames from the final assembly jig 69.

It will be understood that various changes in the steps of the process may be carried on in slightly different sequence and the construction and relation of mechanical parts varied without departing from the scope of the appended claims.

We claim:

1. The method of forming automobile frames consisting of providing light gauge closed box section side rails, permanently attaching to said rails with rivets certain cross members, some of which possess greater flexibility than the side rails to form a relatively flexible frame, lining up and flexing the frame parts into final relative positions, and then permanently securing all of the cross members to the rails while held so flexed to form a rigid frame.

2. The method of forming automobile frames consisting of nesting light gauge channel shape inner rails into light gauge channel shape side rails and securing the same thereto while the light gauge rails are held in finally formed shape to provide rigid closed box section side rails, welding the edges of the two rails together, permanently attaching certain of cross members by rivets to a pair of completed box section rails to form a frame while preliminarily retaining other cross members in approximate place, and then moving the side rails and cross members into final position by stressing the side rails and retaining them in such positions while permanently securing all of the cross members thereto to maintain all parts of the frame in accurate final relative position 3. The method of forming box section side rails for automobile frames consisting of providing a light gauge channel-shape side rail, inserting reinforcements into the channel of the rail while nesting a light gauge channel shape inner rail within the channel of the main rail, inserting centering pins through registering apertures in the rails and reinforcements, flexing the assembled rail into predetermined contour, and then welding the rails and reinforcements together while so held.

4. The method of forming box section side rails for automobile frames consisting of providing a light gauge channel shaped side rail of irregular outline, inserting reinforcements into the channel of the rail while nesting a light gauge channel shaped inner rail within the channel of the main rail with the edges of the flanges of the rails contiguous, inserting centering pins through registering apertures in the rails and reinforcements, flexing the assembled rails into predetermined contour, tack welding said edges, and suspending said assembled rail in a horizontal plane as it is moved along a straight path and engaged with spot welders to spot weld the irregular contiguous edges at intervals.

5. The method of forming box section side rails for automobile frames consisting of providing a light gauge channel shaped side rail with front and rear kickups, inserting box-shape reinforcements into the channel of the rail while nesting a light gauge channel inner rail within the channel of the main rail with the edges of the two rails contiguous, flexing the assembled rail to predetermined contour, tack welding the edges of the inner rail to the edges of the outer rail adjacent the kickups, and then welding the contiguous edges together at spaced intervals throughout its length.

6. The method of making automobile frames consisting of assembling reinforcements in relatively flexible side rails to bring them to substantial rigidity, preliminarily connecting cross members thereto whereby the side rails can be relatively moved and flexed, and then stressing the rails and cross members into final relative shape while welding them together in rigid fixed relation.

7. The method of forming automobile frames consisting of providing side rails, attaching cross members to the rails adjacent the ends of said rails, at least one of said members being permanently connected to the rails, retaining an intermediate cross member in approximate position between the rails, stressing the rails to move them and all cross members into final relative position, and then welding said intermediate cross members to the two rails to form a rigid frame.

8. The method of forming automobile frames consisting of providing side rails, attaching cross members to the rails adjacent the ends of said rails, at least one of said members being permanently connected to the rails, retaining an intermediate cross member in approximate position between the rails, exerting pressure on the rails against their mid-sections outwardly of the longitudinal center line of the frame to move the rails and all cross members into final relative position, and then welding said intermediate cross member to the two rails to form a rigid frame.

9. In the method of squaring an automobile frame having side rails and cross members, consisting of first moving the frame sidewise against abutments along one side of the frame, then moving the frame lengthwise until its forward end strikes an abutment, moving abutments toward opposite sides of the frame, and then exerting pressure on the rails against their mid-sections outwardly of the longitudinal center line of the frame to bend the side rails out into contact with the abutments along its two sides.

10. The method of operatng upon an irregularly shaped elongated article consisting of suspending the article and moving it in a substantially rectilinear path through movable welding apparatus which is mounted to be moved by the rectilinear movement of the irregular contoured article as the same is being operated upon by said welding apparatus.

11. The method of operating upon an irregularly shaped elongated article consisting of suspending an elongated contoured article from a movable carriage, and moving the article in a substantially rectilinear path through a movable welding apparatus which is moved by moving the irregular contour of the article against the welding apparatus to cause it to shift its position to be disposed so as to operate upon the article as it passes through the welding apparatus in a substantially rectilinear path.

12. The method of operating upon an irregularly shaped elongated article consisting of suspending an elongated contoured article from a movable carriage in a manner to be disposed in a horizontal plane during its movement, and moving the article in a substantially rectilinear path through a welding apparatus swiveled on an axis normal to the line of movement of the article whereby said apparatus is caused to be moved by moving the irregular contour of the article against the welding apparatus to cause it to swivel and adapt itself to the contour of the article for operating thereupon as the article moves through the welding apparatus in a substantially rectilinear path.

13. The method of forming automobile frames consisting of rigidly connecting cross members in final relative positions to a pair of side rails and preliminarily connecting other cross members to said rails to form a frame, operating on such incomplete frame to square it and relatively stress the rails and cross members into final position, and then welding the cross members to the rails to rigidly fix the cross members to the rails and to fix the frame in final set condition.

14. The method of making automobile frames consisting of rigidly attaching certain cross members in final relative position between a pair of side rails and preliminarily connecting others to said rails by the insertion of rivets through registering holes in the rails and cross members, operating on such incomplete frame to square it and relatively stress the rails and cross members into final shape and position, and then welding the preliminarily connected cross members to the rails to rigidly fix the cross members thereto and to rigidly fix the frame in final shape.

ROBERT H. WALLACE.
ERNEST RIEMENSCHNEIDER.